United States Patent
Suzuki et al.

(10) Patent No.: US 7,809,315 B2
(45) Date of Patent: Oct. 5, 2010

(54) TRANSFER/TRANSPORT CONDUCTIVE ENDLESS BELT FOR A TANDEM SYSTEM, METHOD FOR PRODUCING SAME, AND IMAGE FORMING APPARATUS EMPLOYING SAME

(75) Inventors: Takahiro Suzuki, Tokyo (JP); Kunio Machida, Tokyo (JP); Koji Takagi, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 134 days.

(21) Appl. No.: 11/722,842

(22) PCT Filed: Dec. 14, 2005

(86) PCT No.: PCT/JP2005/022977
§ 371 (c)(1),
(2), (4) Date: Aug. 30, 2007

(87) PCT Pub. No.: WO2006/070602
PCT Pub. Date: Jul. 6, 2006

(65) Prior Publication Data
US 2007/0286957 A1    Dec. 13, 2007

(30) Foreign Application Priority Data
Dec. 28, 2004  (JP) .............................. 2004-380911
Dec. 28, 2004  (JP) .............................. 2004-380912

(51) Int. Cl.
*G03G 15/01* (2006.01)
*G03G 15/16* (2006.01)
(52) U.S. Cl. ...................................... 399/302; 399/308
(58) Field of Classification Search ................. 399/302, 399/303, 308, 312, 313
See application file for complete search history.

(56) References Cited

U.S. PATENT DOCUMENTS

| | | | | |
|---|---|---|---|---|
| 5,487,707 A | * | 1/1996 | Sharf et al. | 474/253 |
| 5,683,838 A | * | 11/1997 | Iijima et al. | 430/20 |
| 6,536,889 B1 | * | 3/2003 | Biegelsen et al. | 347/95 |
| 6,595,802 B1 | * | 7/2003 | Watanabe et al. | 439/620.05 |
| 2002/0159799 A1 | * | 10/2002 | Kobayashi et al. | 399/302 |
| 2004/0031439 A1 | * | 2/2004 | Shimizu et al. | 118/60 |

FOREIGN PATENT DOCUMENTS

| | | | |
|---|---|---|---|
| JP | 03294592 A | * | 12/1991 |
| JP | 04080007 A | * | 3/1992 |

(Continued)

*Primary Examiner*—Quana M Grainger
(74) *Attorney, Agent, or Firm*—Sughrue Mion, PLLC

(57) ABSTRACT

Provided are a conductive endless belt, a method of producing the same, and an image forming apparatus employing the same, the conductive endless belt having both desirable intended belt properties and surface properties, and being producible without known problems in terms of cost and quality. A conductive endless belt 100 is used as a transfer/transport conductive endless belt for a tandem system in which the conductive endless belt is circularly driven by a drive member so as to transport a recording medium held by the belt through electrostatic attraction to four differing image forming bodies, in which the toner images are sequentially transferred onto the recording medium. The conductive endless belt 100 is composed of a belt base 101 having thereon a resin layer 102, the resin layer 102 containing an ultraviolet or electron beam curable resin. The resin layer 102 preferably contains a conductive agent, specifically carbon black.

14 Claims, 2 Drawing Sheets

FOREIGN PATENT DOCUMENTS

| | | | |
|---|---|---|---|
| JP | 4-356082 A | 12/1992 |
| JP | 5-12125 U | 2/1993 |
| JP | 2002-132053 A | 5/2002 |
| JP | 2004-157289 A | 6/2004 |
| JP | 2004-264763 A | 9/2004 |
| JP | 2004264763 A * | 9/2004 |
| JP | 2006150896 A * | 6/2006 |

* cited by examiner

TRANSFER/TRANSPORT CONDUCTIVE ENDLESS BELT FOR A TANDEM SYSTEM, METHOD FOR PRODUCING SAME, AND IMAGE FORMING APPARATUS EMPLOYING SAME

TECHNICAL FIELD

The present invention relates to a conductive endless belt (hereinafter may be simply referred to as "belt"), a method of producing the same, and an image forming apparatus employing the same, the conductive endless belt being used for transferring a toner image onto a recording medium such as paper in an electrostatic recording process performed in an electrophotographic apparatus or electrostatic recording apparatus such as a copy machine or printer, the toner image being formed by supplying a developer onto the surface of an image forming body such as a latent image holder holding a latent image thereon.

BACKGROUND ART

Heretofore, in an electrostatic recording process performed in, for example, a copy machine or printer, printing has been carried out by the steps of uniformly electrifying the surface of a photoconductor (latent image holder), forming an electrostatic latent image by projecting an image from an optical system onto the photoconductor to diselectrify the area exposed to light, then supplying a toner to the electrostatic latent image to form a toner image through electrostatic adhesion of the toner, and transferring the toner image onto a recording medium such as paper, OHP, or photographic paper.

Also in a color printer or color copy machine, printing is basically carried out in accordance with the above-described process, but in the case of color printing in which four color toners, magenta, yellow, cyan, and black, are used for reproducing color tones, a step of overlapping the color toners at a predetermined ratio is required to obtain an intended tone. In order to carry out the step, various methods have been proposed.

First, there is an image-on-image development system in which an electrostatic latent image is visualized with toners supplied onto a photoconductor in the same manner as monochrome printing; four color toners, or the magenta, yellow, cyan and black toners are overlaid one after another to develop the electrostatic latent image into a color toner image on the photoconductor. This system enables a relatively compact apparatus structure. However, gradation control is very difficult in this system, so there is a problem that high image quality cannot be obtained.

Second, there is a tandem system in which a color image is reproduced by developing latent images on four photoconductive drums with magenta, yellow, cyan, and black toners into magenta, yellow, cyan, and black toner images, and sequentially transferring the toner images from the photoconductive drums, which have been disposed in series, onto a recording medium such as paper. This system provides a good image, but the apparatus is large and expensive because the four photoconductive drums each having an electrification device and a development device are disposed in series.

FIG. 2 shows an example of the structure of a printing unit in an image forming apparatus for the tandem system. Four printing units, each printing unit containing a photoconductive drum 1, an electrification roll 2, a development roll 3, a development blade 4, a toner supply roll 5, and a cleaning blade 6, are disposed in series to correspond to yellow toner Y, magenta toner M, cyan toner C, and black toner B. The printing units are circularly driven by a driving roller (driving member) 9 to sequentially transfer the toners onto the sheet transported by a transfer/transport belt 10 thereby forming a color image. The transfer/transport belt is electrified and diselectrified by an electrification roll 7 and a diselectrification roll 8, respectively. In order to electrify a sheet to make it attached to the belt, an attraction roller (not shown) is used. These processes reduce the generation of ozone. The attraction roller transfers the sheet from a transport path onto the transfer/transport belt 10, and also fixes it thereon by electrostatic attraction. The transferred sheet can be separated from the belt only by curvature separation by lowering the transfer voltage to weaken the attraction power between the sheet and the transfer/transport belt.

The transfer/transport belt 10 may be made of a resistive material or a dielectric material, both of them having advantages and disadvantages. Since a resistive belt retains charges for only a short time, when the belt is used for transfer in an tandem system apparatus, charge injection caused by the transfer is low, and the increase in voltage is relatively small even with continuous transfer of four colors. In addition, even when repeatedly used for transfer of the succeeding sheet, the resistive belt does not require to be electrically reset because charges thereon have already been released. However, the resistance value of the resistive belt varies according to environmental variations, which affects the transfer efficiency, and the belt is susceptible to the thickness and width of the sheet.

On the other hand, the dielectric material belt does not naturally release injected charges, so that both of injection and release of charges have to be electrically controlled. However, since the belt stably holds charges, it securely attracts a sheet thereto and transports it with high accuracy. In addition, the dielectric constant is less dependent on the temperature and humidity, so that the transfer process is relatively stable against environmental variations. A disadvantage is that charges are accumulated in the belt by every transfer, which increases the transfer voltage.

Third, there is a transfer drum system in which a recording medium such as paper is wound around a transfer drum and rotated for four turns, in the rotations, magenta, yellow, cyan, and black toners on a photoconductor are sequentially transferred onto the recording medium to reproduce a color image. This system provides relatively high image quality. However, there is a problem that the type of the recording medium is limited, because it is hard to wind a heavy recording medium such as a postcard around the transfer drum.

As an alternative system to the above-described image-on-image development system, tandem system, and transfer drum system, an intermediate transfer system has been proposed. The intermediate transfer system provides favorable image quality with no increase in the size of the apparatus or limitation on the type of the recording medium.

More specifically, in accordance with the intermediate transfer method, an intermediate transfer member composed of a belt and a drum for transferring and temporarily holding a toner image is provided, and four photoconductors having a magenta toner image, a yellow toner image, a cyan toner image, and a black toner image formed thereon are disposed around the intermediate transfer member. The four color toner images are sequentially transferred onto the intermediate transfer member to form a color image on the intermediate transfer member, and the color image is then transferred onto a recording medium such as paper. The gradation is thus adjusted by superimposing the four toner images, so that high image quality is provided. In addition, the size of the apparatus is not significantly increased because the photoconductors are not required to be disposed in series as in the tandem system, and the type of the recording medium is not limited because the recording medium is not required to be wound around the drum.

FIG. 3 shows an example of the image forming apparatus for forming a color image using the intermediate transfer system, the apparatus including an intermediate transfer member in the form of an endless belt.

In FIG. 3, reference numeral 11 indicates a drum-shaped photoconductor which is allowed to rotate in the direction shown by an arrow in the figure. The photoconductor 11 is electrified by a primary electrifier 12, subsequently the portion exposed to an image exposure 13 is diselectrified, an electrostatic latent image corresponding to a first color component is formed on the photoconductor 11, the electrostatic latent image is developed by a developing device 41 with the first color magenta toner M, and the first color magenta toner image is formed on the photoconductor 11. Subsequently, the toner image is circularly driven by a driving roller (driving member) 30 to be transferred onto an intermediate transfer member 20 which is circularly rotating in contact with the photoconductor 11. In this case, the transfer from the photoconductor 11 onto the intermediate transfer member 20 is carried out by a primary transfer bias applied from a power supply 61 to the intermediate transfer member 20 at a nip portion between the photoconductor 11 and the intermediate transfer member 20. After the first color magenta toner image is transferred onto the intermediate transfer member 20, the surface of the photoconductor 11 is cleaned by a cleaning device 14, and thus the photoconductor 11 completes the first rotation to carry out the development and transfer operation.

Subsequently, the photoconductor 11 rotates for three turns, and, in the turns, a second color cyan toner image, a third color yellow toner image, and a fourth color black toner image are sequentially formed in that order on the photoconductor 11 by the developing devices 42 to 44, respectively, so that the four color images are superimposed on the intermediate transfer member 20 after the four turns, and thus a composite color toner image corresponding to the intended color image is formed on the intermediate transfer member 20. In the apparatus shown in FIG. 3, the positions of the developing devices 41 to 44 are sequentially changed after every turn of the photoconductor 11 to carry out development with the magenta toner M, cyan toner C, yellow toner Y, and black toner B in that order.

Next, a transfer roller 25 comes in to contact with the intermediate transfer member 20 having the composite color toner image thereon, and a recording medium 26 such as paper is fed from a paper feeding cassette 19 to a nip portion between the roller 25 and the member 20. Simultaneously, a secondary transfer bias is applied from a power supply 29 to the transfer roller 25, the composite color toner image is transferred from the intermediate transfer member 20 onto the recording medium 26, and is fixed thereon by heating to make a final image. The intermediate transfer member 20, after transferring the composite color toner image to the recording medium 26, is cleaned by a cleaning device 35 to remove transfer residual toner from the surface thereof, and is returned to the initial state to prepare for the next image formation.

In addition, there is a tandem intermediate transfer system which combines the tandem system and the intermediate transfer system. FIG. 4 illustrates an image forming apparatus of the tandem intermediate transfer system for forming a color image using an endless belt-shaped tandem intermediate transfer member.

In the apparatus shown in FIG. 4, a first development portion 54a to a fourth development portion 54d for developing electrostatic latent images on photoconductive drums 52a to 52d with yellow, magenta, cyan, and black toners, respectively, are sequentially disposed along a tandem intermediate transfer member 50. The tandem type intermediate transfer member 50 is circularly driven in the direction indicated by an arrow shown in FIG. 4, so that four color toner images formed on the photoconductive drums 52a to 52d of the development portions 54a to 54d are sequentially transferred onto the tandem intermediate transfer member 50 to form a color toner image thereon. The toner image is then transferred onto a recording medium 53 such as paper to be printed out.

In FIG. 4, reference numeral 55 indicates a drive roller or a tension roller for circularly driving the tandem type intermediate transfer member 50, reference numeral 56 indicates a recording medium feeding roller, reference numeral 57 indicates a recording medium feeding device, and reference numeral 58 indicates a fixing device for fixing an image on the recording medium by heating or other methods. Reference numeral 59 indicates a power supply device (voltage application unit) for applying a voltage to the tandem intermediate transfer member 50, and the power supply device 59 is adapted to reverse the applied voltage from positive to negative, and vice versa, depending on whether the toner images are transferred from the photoconductive drums 52a to 52d to the tandem intermediate transfer member 50, or from the tandem intermediate transfer member 50 to the recording medium 53.

In the above-described various image forming apparatuses, the conductive endless belt used as, for example, the transfer/transport belt 10, intermediate transfer member 20, or tandem type intermediate transfer member 50 is commonly a semiconductive resin film belt or a fiber reinforced rubber belt. Examples of the semiconductive resin film belt include a conductive endless belt described in Japanese Patent Application Laid-Open Publication No. 2002-132053 (Claims and other sections), which is composed primarily of a thermoplastic polyalkylene naphthalate resin, or a polymer alloy or polymer blend of the resin with another thermoplastic resin.

In addition, a semiconductive belt having a laminated structure for an electrophotographic apparatus is described in Japanese Patent Application Laid-Open Publication No. 2004-157289 (Claims and other sections), which is composed of a thin cylindrical elastic belt base having a surface layer on the external surface thereof, the surface layer being composed primarily of a copolymer of a fluorine-modified acrylate and another acrylate, a fluorinated olefin-based polymer, and a copolymer of methyl methacrylate and another monomer containing a (meth)acryloyl group. Each of the tensile breaking strength, tensile breaking elongation, and modulus of elasticity of the semiconductive belt has a specified value.

DISCLOSURE OF INVENTION

Problems to be Solved by Invention

As described in Japanese Patent Application Laid-Open Publication No. 2004-157289, in known conductive endless belts, another layer is provided on a belt base to make a laminated structure having two or more layers so as to achieve both desirable belt properties and surface properties. Such a belt having a laminated structure is usually formed, as described in Japanese Patent Application Laid-Open Publication No. 2004-157289, paragraph and others, by dipping a belt base into a solvent-based or water-based paint, or spraying the paint on the surface of the belt base, followed by drying and curing the coating by heat or hot air. Drying of the paint by heat or hot air takes a long time, so that the mass production of the belt requires a long drying line. In addition, in this case, variations in the temperature distribution in the drying line and the volume of air significantly affect the conductivity and surface condition of the resulting belt, which makes it impossible to stably produce a belt having intended high precision. More specifically, the belt obtained through drying and curing using heat or the like has problems in terms of cost and quality.

Accordingly, the object of the present invention is to provide a conductive endless belt, a method of producing the same, and an image forming apparatus employing the same, the conductive endless belt having both desirable belt properties and surface properties, and being producible without known problems in terms of cost and quality.

Means for Solving the Problem

As a result of eager investigation to solve the above problems, the inventors have found that the following structure provides a conductive endless belt having a laminated structure without the above-described problems associated with conventional technologies, and thus achieved the present invention.

More specifically, the conductive endless belt in accordance with an embodiment of the present invention is a transfer/transport conductive endless belt for a tandem system in which the conductive endless belt is circularly driven by a drive member so as to transport a recording medium held by the belt through electrostatic attraction to four differing image forming bodies, in which the toner images are sequentially transferred onto the recording medium, the conductive endless belt being composed of a belt base having thereon a resin layer, the resin layer containing an ultraviolet or electron beam curable resin.

The conductive endless belt in accordance with another embodiment of the present invention is a conductive endless belt used as an intermediate transfer member which is disposed between an image forming body and a recording medium, is circularly driven by a drive member, transfers a toner image from the surface of the image forming body onto the surface of the belt to temporarily hold it thereon, and transfers the toner image onto a recording medium, the conductive endless belt being composed of a belt base having thereon a resin layer, the resin layer containing an ultraviolet or electron beam curable resin.

The conductive endless belt in accordance with still another embodiment of the present invention is a conductive endless belt used as an intermediate transfer member which is disposed between four differing image forming bodies and a recording medium, is circularly driven by a drive member, sequentially transfers toner images from the surfaces of the image forming bodies onto the surface of the belt to temporarily hold them thereon, and transfers the toner images onto a recording medium, the conductive endless belt being composed of a belt base having thereon a resin layer, the resin layer containing an ultraviolet or electron beam curable resin.

In the belt of the present invention, the resin layer preferably contains a conductive agent, specifically carbon black, and the ultraviolet or electron beam curable resin preferably contains fluorine and/or silicon.

The ultraviolet curable resin preferably contains an ultraviolet polymerization initiator having a maximum ultraviolet absorption wavelength of 400 nm or more, and more preferably contains the ultraviolet polymerization initiator and another ultraviolet polymerization initiator having a maximum ultraviolet absorption wavelength below 400 nm. The conductive agent is preferably used in combination of two or more types, and the thickness of the resin layer is preferably 1 to 30 μm.

The content of the carbon black is preferably in the range of 1 to 30 parts by weight with reference to 100 parts by weight of the ultraviolet or electron beam curable resin, and the volume resistivity is preferably in the range of 102 Ωcm to 1013 Ωcm.

The method of the present invention of producing a conductive endless belt is a method of producing the conductive endless belt of the present invention, which contains the steps of applying a solvent-free coating liquid containing the ultraviolet or electron beam curable resin onto the belt base, and curing the coating liquid thus applied by irradiation with ultraviolet light or electron beams thereby forming the resin layer.

In addition, the image forming apparatus of the present invention includes the conductive endless belt of the present invention.

Effect of Invention

In accordance with the present invention, an ultraviolet or electron beam curable resin is used as a constituent material of the resin layer provided on the belt base, which has enabled fast, easy, and reliable curing and formation of a resin layer through an appropriate control of the dose of ultraviolet light or electron beams. Accordingly, a high-quality belt having intended belt properties and surface properties can be stably produced without problems in terms of cost.

Figure 1:
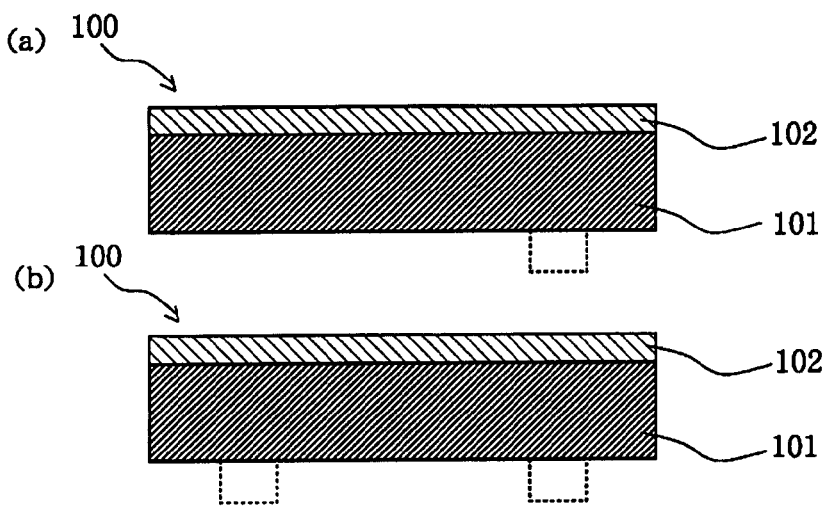
FIG. 1 is a cross-sectional view showing a conductive endless belt in the width direction in accordance with an embodiment of the present invention.

| Reference Numerals | |
| --- | --- |
| 1, 11, 52a to 52d | photoconductive drums |
| 2, 7 | electrification roll |
| 3 | development roll |
| 4 | development blade |
| 5 | toner supply roll |
| 6 | cleaning blade |
| 8 | dielectrification roll |
| 9, 30, 55 | driving roller (driving member) |
| 10 | transfer/transport belt |
| 12 | primary electrifier |
| 13 | image exposure |
| 14, 35 | cleaning device |
| 19 | paper feeding cassette |
| 20 | intermediate transfer member |

-continued

| Reference Numerals | |
|---|---|
| 25 | transfer roller |
| 26, 53 | recording medium |
| 29, 61 | power supply |
| 41, 42, 43, 44 | developing devices |
| 50 | tandem intermediate transfer member |
| 54a to 54d | first to fourth development portions |
| 56 | recording medium feeding roller |
| 57 | recording medium feeding device |
| 58 | fixing device |
| 59 | power supply device (voltage application unit) |
| 100 | conductive endless belt |
| 101 | belt base |
| 102 | resin layer |

BEST MODE FOR CARRYING OUT THE INVENTION

Preferable embodiments of the present invention are described below in detail.

Conductive endless belts are broadly divided into jointed belts and jointless belts (so-called seamless belts), and both of them may be used in the present invention. However, preferable is a seamless belt. As described above, the conductive endless belt of the present invention may be used as a transfer member or the like under the tandem system, intermediate transfer system, or tandem intermediate transfer system.

Figure 2:
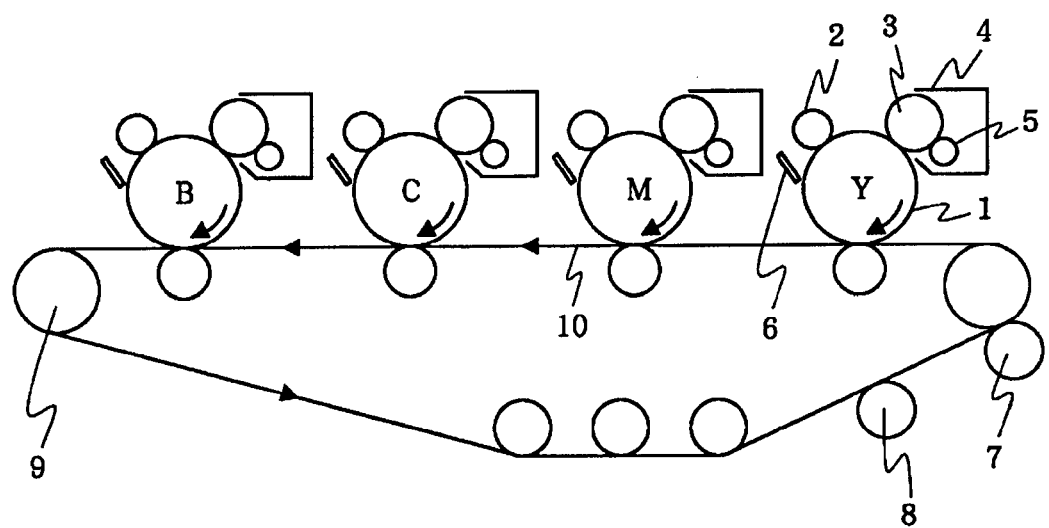
FIG. 2 is a schematic view showing a tandem system image forming apparatus including a transfer/transport belt, as one example of an image forming apparatus of the present invention.

In cases where the conductive endless belt of the present invention is, for example, the transfer/transport belt indicated by reference numeral 10 in FIG. 2, the conductive endless belt is driven by a drive member such as the drive roller 9, and the toners are sequentially transferred onto a recording medium transported by the belt, thereby forming a color image.

Figure 3:
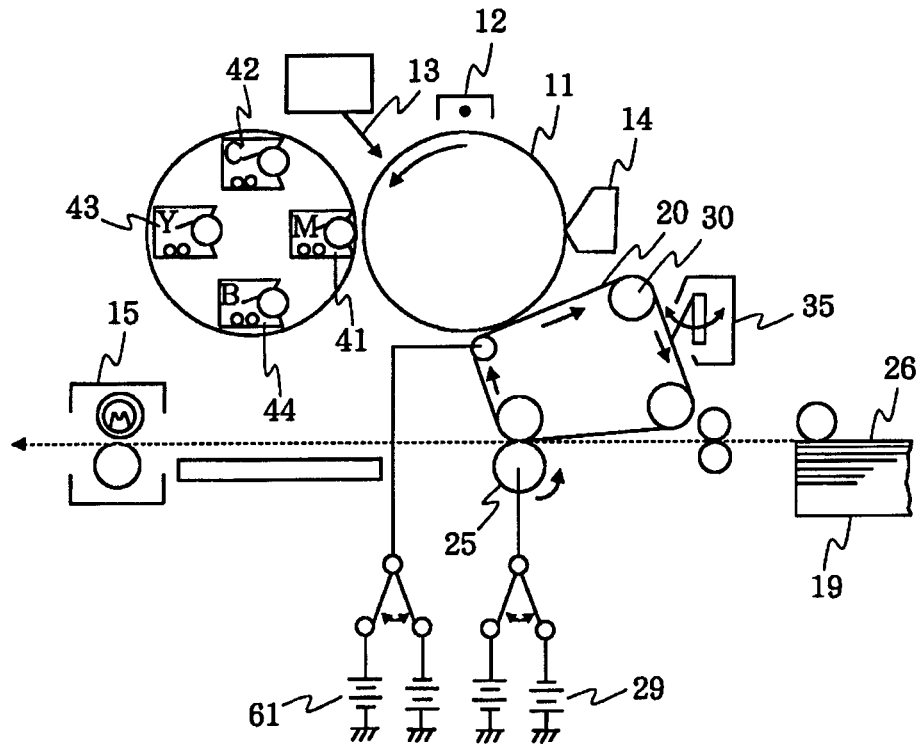
FIG. 3 is a schematic view showing an intermediate transfer apparatus including an intermediate transfer member, as another example of the image forming apparatus of the present invention.

In cases where the conductive endless belt of the present invention is, for example, the intermediate transfer member indicated by reference numeral 20 in FIG. 3, the belt is circularly driven by a drive member such as the drive roller 30 and is disposed between the photoconductive drum (latent image holder) 11 and the recording medium 26 such as paper, so that the belt transfers a toner image from the surface of the photoconductive drum 11 onto the belt to temporarily hold it thereon, and then transfers the toner image onto the recording medium 26. As described above, the apparatus shown in FIG. 3 carries out color printing under the intermediate transfer system.

Figure 4:
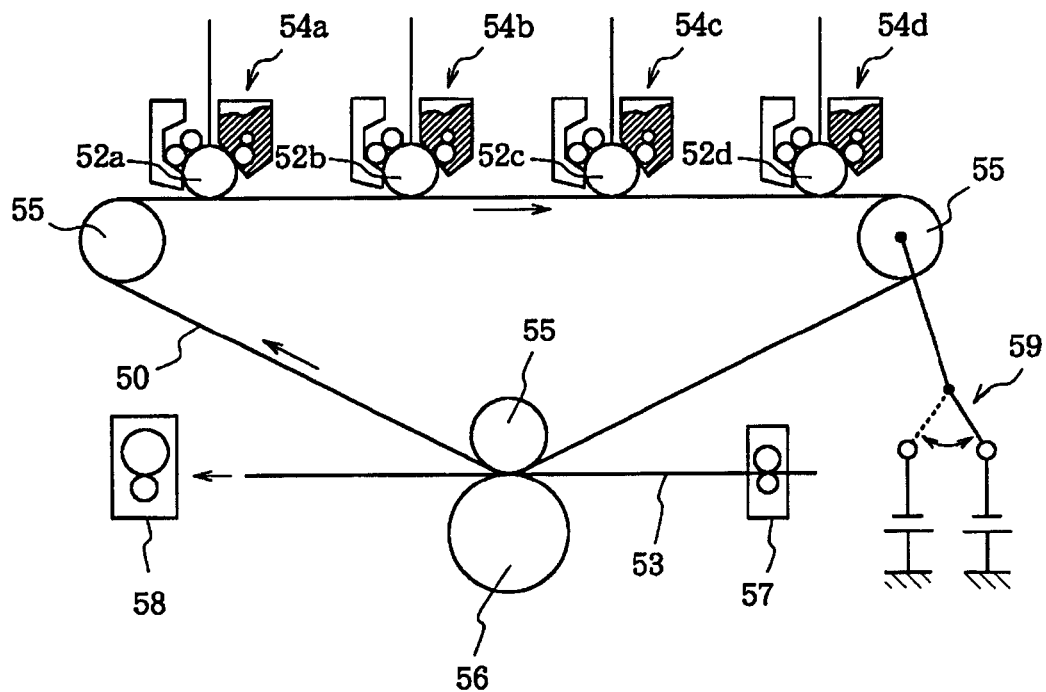
FIG. 4 is a schematic view showing a tandem system intermediate transfer apparatus including a tandem intermediate transfer member, as still another example of the image forming apparatus of the present invention.

In cases where the conductive endless belt of the present invention is, for example, the tandem intermediate transfer member indicated by reference numeral 50 in FIG. 4, the belt is disposed between the development portions 54a to 54d including the photoconductive drums 52a to 52d and the recording medium 53 such as paper and is circularly driven by a drive member such as the drive rollers 55, so that the belt transfers a toner image from the surface of the photoconductive drums 52a to 52d onto the belt to temporarily hold them thereon, and then transfers the toner images onto the recording medium 53, thereby forming a color image.

FIG. 1 is a partial cross-sectional view showing a preferable example of the conductive endless belt of the present invention. As shown in the figure, the belt of the present invention 100 has a resin layer 102 on a belt base 101, the resin layer 102 containing an ultraviolet or electron beam curable resin. The resin layer 102 is composed of an ultraviolet or electron beam curable resin, which has enabled faster, easier, and more reliable curing and formation of a resin layer through an appropriate control of the dose of ultraviolet light or electron beams in comparison with known ones. The resin layer 102 in accordance with the present invention is a single layer in the illustrated example, or may be composed of a plurality of layers different in material and physical properties. In the latter case, at least one of the plurality of layers contains the ultraviolet or electron beam curable resin.

The ultraviolet curable resin for use in the present invention refers to a resin which is cured by irradiation with ultraviolet light (UV) having a wavelength of about 200 to 400 nm, and is usually composed of a prepolymer, a monomer, an ultraviolet polymerization initiator, and an additive. Specific examples of the ultraviolet curable resin include a polyester resin, a polyether resin, a fluorocarbon resin, an epoxy resin, an amino resin, a polyamide resin, an acrylic resin, an acrylic urethane resin, an urethane resin, an alkyd resin, a phenolic resin, a melamine resin, an urea resin, a silicone resin, a polyvinyl butyral resin. These resins may be used alone or in combination of two or more of them.

In addition, a modified resin prepared by introducing a specific functional group into one of the above resins also may be used. Specifically, the functional group to be introduced preferably has a crosslinked structure to improve the mechanical strength and environmental resistance of the resin layer 102.

Among the above-described ultraviolet curable resins, (meth)acrylate-based ultraviolet curable resins including (meth)acrylate oligomers are particularly preferable.

Examples of the (meth)acrylate oligomer include urethane-based (meth)acrylate oligomers, epoxy-based (meth)acrylate oligomers, ether-based (meth)acrylate oligomers, ester-based (meth)acrylate oligomers, polycarbonate-based (meth)acrylate oligomers, and fluorine-based or silicone-based (meth)acryl oligomers.

The above-described (meth)acrylate oligomer may be synthesized by reacting (meth)acrylic acid with, for example, polyethylene glycol, polyoxypropylene glycol, polytetramethylene ether glycol, a bisphenol A type epoxy resin, a phenol novolac type epoxy resin, or an adduct of a polyhydric alcohol and ε-caprolactone, or by urethanizing a polyisocyanate compound with a (meth)acrylate compound having a hydroxy group.

The urethane-based (meth)acrylate oligomer may be produced by urethanizing a polyol with an isocyanate compound and a (meth)acrylate compound having a hydroxy group.

The epoxy-based (meth)acrylate oligomer may be any reaction product of (meth)acrylic acid and a compound having a glycidyl group, and is particularly preferably a reaction product of (meth)acrylic acid and a compound having a glycidyl group and a ring structure such as benzene, naphthalene, spiro, dicyclopentadiene, or tricyclodecane.

The ether-based (meth)acrylate oligomer, ester-based (meth)acrylate oligomer, and polycarbonate-based (meth)acrylate oligomer may be produced by reacting (meth)acrylic acid with a corresponding polyol (polyether polyol, polyester polyol, and polycarbonate polyol, respectively).

As appropriate, the ultraviolet curable resin contains a reactive diluent having a polymerizable double bond to adjust the viscosity. The reactive diluent may be, for example, a monofunctional, bifunctional, or polyfunctional polymerizable compound prepared by bonding (meth)acrylic acid to a compound having an amino acid and a hydroxy group by esterification and amidation. In usual cases, the content of the diluent is preferably 10 to 200 parts by weight with reference to 100 parts by weight of the (meth)acrylate oligomer.

The ultraviolet curable resin contains an ultraviolet polymerization initiator to promote the initiation of curing reaction by irradiation with ultraviolet light. The ultraviolet polymerization initiator is not particularly limited, and may be a known one. However, in cases where a carbon-based conductive agent is used as the conductive agent in the resin layer 102, irradiated ultraviolet light may be hindered by the carbon-based conductive agent from reaching into the resin layer 102, which results in insufficient function of the ultraviolet polymerization initiator, so that the curing reaction may not proceed. Therefore, the ultraviolet polymerization initiator is preferably sensitive to long wavelength ultraviolet light which readily enters into the resin layer 102. More specifically, the ultraviolet polymerization initiator preferably has a maximum ultraviolet absorption wavelength of 400 nm or more. Examples of the ultraviolet polymerization initiator having an absorption region covering such a long wavelength include α-aminoacetophenone, acylphosphine oxide, and thioxanthone, amine, and specific examples thereof include bis(2,4,6-trimethylbenzoyl)-phenylphosphine oxide and 2-methyl-1-[4-(methylthio)phenyl]-2-morpholinopropane-1-one.

In this case, the above-described ultraviolet polymerization initiator is preferably used in combination with another ultraviolet polymerization initiator having a maximum ultraviolet absorption wavelength below 400 nm to favorably progress the curing reaction in the vicinity of the surface of the resin layer 102 as well as the inside of the resin layer 102 inside, particularly in cases where a carbon-based conductive agent is used.

Examples of the ultraviolet polymerization initiator having an absorption region covering such a short wavelength include 2,2-dimethoxy-1,2diphenylethane-1-one, 1-hydroxy-cyclohexyl-phenylketone, 2-hydroxy-2-methyl-1-phenylpropane-1-one, 1-[4-(2hydroxyethoxy)phenyl]-2-hydroxy-2-methyl-1-propane-1-one, and 2-methyl-1-[4-phenyl]-2-morpholino propane-1-one.

The content of the ultraviolet polymerization initiator is, for example, preferably 0.1 to 10 parts by weight with reference to 100 parts by weight of the (meth)acrylate oligomer.

In the resin layer 102, in addition to the above-described components, a tertiary amine such as triethylamine or triethanolamine, an alkyl phosphine-based photopolymerization promoting agent such as triphenylphosphine, or a thioether-based photopolymerization promoting agent such as p-thiodiglycol may be added as necessary to the ultraviolet curable resin to promote the polymerization reaction by the ultraviolet polymerization initiator. In cases where one of these compounds is added, in usual cases, the content is preferably in the range of 0.01 to 10 parts by weight with reference to 100 parts by weight of the (meth)acrylate oligomer.

In the present invention, an electron beam curable resin refers to a resin which contains no crosslinking agent, polymerization initiator, or cleaving agent, and is self-crosslinked by energy of electron beam irradiation without help of the agents. However, in practical production, the crosslinking agent and others may be added to form the layer, and the electron beam curable resin in accordance with the present invention does not reject the addition of the crosslinking agent and others.

Specific examples of the electron beam curable resin include a polyester resin, a polyether resin, a fluorocarbon resin, an epoxy resin, an amino resin, a polyamide resin, an acrylic resin, an acrylic urethane resin, an urethane resin, an alkyd resin, a phenolic resin, a melamine resin, an urea resin, a silicone resin, and a polyvinyl butyral resin. These resins may be used alone or in combination of two or more of them.

In addition, a modified resin prepared by introducing a specific functional group into one of the above resins also may be used. Specifically, the functional group to be introduced preferably has a crosslinked structure to improve the mechanical strength and environmental resistance of the resin layer 102.

Among the above-described electron beam curable resins, a (meth)acrylate-based electron beam curable resin containing a (meth)acrylate oligomer is particularly preferable.

Examples of the (meth)acrylate oligomer include an urethane-based (meth)acrylate oligomer, an epoxy-based (meth)acrylate oligomer, an ether-based (meth)acrylate oligomer, an ester-based (meth)acrylate oligomer, a polycarbonate-based (meth)acrylate oligomer, and a fluorine-based or silicone-based (meth)acryl oligomer.

The (meth)acrylate oligomer may be synthesized by reacting (meth)acrylic acid with, for example, polyethylene glycol, polyoxypropylene glycol, polytetramethylene ether glycol, a bisphenol A type epoxy resin, a phenol novolac type epoxy resin, or an adduct of a polyhydric alcohol and ε-caprolactone, or by urethanizing a polyisocyanate compound with a (meth)acrylate compound having a hydroxy group.

The urethane-based (meth)acrylate oligomer may be produced by urethanizing a polyol with an isocyanate compound and a (meth)acrylate compound having a hydroxy group.

The epoxy-based (meth)acrylate oligomer may be any reaction product of (meth)acrylic acid and a compound having a glycidyl group, and is particularly preferably a reaction product of (meth)acrylic acid and a compound having a glycidyl group and a ring structure such as benzene, naphthalene, spiro, dicyclopentadiene, or tricyclodecane.

The ether-based (meth)acrylate oligomer, ester-based (meth)acrylate oligomer, and polycarbonate-based (meth)acrylate oligomer may be produced by reacting (meth)acrylic acid with a corresponding polyol (polyether polyol, polyester polyol, and polycarbonate polyol, respectively).

As appropriate, the electron beam curable resin contains a reactive diluent having a polymerizable double bond to adjust the viscosity. The reactive diluent may be, for example, a monofunctional, bifunctional, or polyfunctional polymerizable compound prepared by bonding (meth)acrylic acid to a compound having an amino acid and a hydroxy group by esterification and amidation. In usual cases, the content of the diluent is preferably 10 to 200 parts by weight with reference to 100 parts by weight of the (meth)acrylate oligomer.

Regarding the resin layer 102 which is disposed outermost, the ultraviolet or electron beam curable resin composing the resin layer 102 preferably contains fluorine and/or silicon to reduce the surface energy of the resin layer 102 as the outermost layer, which results in the decrease of the friction resistance of the belt surface and the improvement of the toner releasability, thereby reducing wear during long-term use to improve the durability.

The fluorine-containing ultraviolet or electron beam curable resin is preferably made from a fluorine-containing compound having a polymerizable carbon-carbon double bond, and may be exclusively composed of the fluorine-containing compound having a polymerizable carbon-carbon double bond, or may be composed of a composition containing a fluorine-containing compound having a polymerizable carbon-carbon double bond and other compound having a polymerizable carbon-carbon double bond.

Preferable examples of the fluorine-containing compound having a polymerizable carbon-carbon double bond include fluoroolefins and fluoro(meth)acrylates.

Preferable fluoroolefins are those having 2 to 12 carbon atoms in which one to all hydrogen atoms have been substituted with fluorine, and specific examples thereof include hexafluoropropene [$CF_3CF=CF_2$, fluorine content 76% by weight], (perfluorobutyl)ethylene [F(CF$_2$)$_4$CH=CH$_2$, fluorine content 69% by weight], (perfluorohexyl)ethylene [F(CF$_2$)$_6$CH=CH$_2$, fluorine content 71% by weight], (perfluorooctyl)ethylene [F(CF$_2$)$_8$CH=CH$_2$, fluorine content 72% by weight], (perfluorodecyl)ethylene [F(CF$_2$)$_{10}$CH=CH$_2$, fluorine content 73% by weight], chlorotrifluoroethylene [CF$_2$=CFCl, fluorine content 49% by weight], 1-methoxy-(perfluoro-2-methyl-1-propene [(CF$_3$)$_2$C=CFOCH$_3$, fluorine content 63% by weight], 1,4-divinyloctafluorobutane [(CF$_2$)$_4$(CH=CH$_2$)$_2$, fluorine content 60% by weight], 1,6-divinyldodecafluorohexane [(CF$_2$)$_6$(CH=CH$_2$)$_2$, fluorine content 64% by weight], and 1,8-divinylhexadecafluorooctane [(CF$_2$)$_8$(CH=CH$_2$)$_2$, fluorine content 67% by weight].

Preferable fluoro(meth)acrylates are fluoroalkyl (meth)acrylates having 5 to 16 carbon atoms in which one to all hydrogen atoms have been substituted with fluorine, and specific examples thereof include 2,2,2-trifluoroethyl acrylate (CF$_3$CH$_2$OCOCH=CH$_2$, fluorine content 34% by weight), 2,2,3,3,3-pentafluoropropyl acrylate (CF$_3$CF$_2$CH$_2$OCOCH=CH$_2$, fluorine content 44% by weight), F(CF$_2$)$_4$CH$_2$CH$_2$OCOCH=CH$_2$, (fluorine content 51% by weight), 2,2,2-trifluoroethyl acrylate [CF$_3$CH$_2$OCOCH=CH$_2$, fluorine content 37% by weight], 2,2,3,3,3-pentafluoropropyl acrylate [CF$_3$CF$_2$CH$_2$OCOCH=CH$_2$, fluorine content 47% by weight], 2-(perfluorobutyl)ethyl acrylate [F(CF$_2$)$_4$CH$_2$CH$_2$OCOCH=CH$_2$, fluorine content 54% by weight], 3-(perfluorobutyl)-2-hydroxypropyl acrylate [F(CF$_2$)$_4$CH$_2$CH(OH)CH$_2$OCOCH=CH$_2$, fluorine content 49% by weight], 2-(perfluorohexyl)ethylacrylate [F(CF$_2$)$_6$CH$_2$CH$_2$OCOCH=CH$_2$, fluorine content 59% by weight], 3-(perfluorohexyl)-2-hydroxypropyl acrylate [F(CF$_2$)$_6$CH$_2$CH(OH)CH$_2$OCOCH=CH$_2$, fluorine content 55% by weight], 2-(perfluorooctyl)ethyl acrylate [F(CF$_2$)$_8$CH$_2$CH$_2$OCOCH=CH$_2$, fluorine content 62% by weight], 3-(perfluorooctyl)-2-hydroxy propyl acrylate [F(CF$_2$)$_8$CH$_2$CH(OH)CH$_2$OCOCH=CH$_2$, fluorine content 59% by weight], 2-(perfluorodecyl)ethyl acrylate [F(CF$_2$)$_{10}$CH$_2$CH$_2$OCOCH=CH$_2$, fluorine content 65% by weight], 2-(perfluoro-3-methylbutyl)ethyl acrylate [(CF$_3$)$_2$CF(CF$_2$)$_2$CH$_2$CH$_2$OCOCH=CH$_2$, fluorine content 57% by weight], 3-(perfluoro-3-methylbutyl)-2-hydroxypropyl acrylate [(CF$_3$)$_2$CF(CF$_2$)$_2$CH$_2$CH(OH)CH$_2$OCOCH=CH$_2$, fluorine content 52% by weight], 2-(perfluoro-5-methylhexyl)ethyl acrylate [(CF$_3$)$_2$CF(CF$_2$)$_2$CH$_2$CH$_2$OCOCH=CH$_2$, fluorine content 61% by weight], 3-(perfluoro-5-methylhexyl)-2-hydroxypropyl acrylate [(CF$_3$)$_2$CF(CF$_2$)$_4$CH$_2$CH(OH)CH$_2$OCOCH=CH$_2$, fluorine content 57% by weight], 2-(perfluoro-7-methyloctyl)ethyl acrylate [(CF$_3$)$_2$CF(CF$_2$)$_6$CH$_2$CH$_2$OCOCH=CH$_2$, fluorine content 64% by weight], 3-(perfluoro-7-methyloctyl)-2-hydroxypropyl acrylate [(CF$_3$)$_2$CF(CF$_2$)$_6$CH$_2$CH(OH)CH$_2$OCOCH=CH$_2$, fluorine content 60% by weight], 1H,1H,3H-tetrafluoropropyl acrylate [H(CF$_2$)$_2$CH$_2$OCOCH=CH$_2$, fluorine content 41% by weight], 1H,1H,5H-octafluoropentyl acrylate [H(CF$_2$)$_4$CH$_2$OCOCH=CH$_2$, fluorine content 53% by weight], 1H,1H,7H-dodecafluoroheptyl acrylate [H(CF$_2$)$_6$CH$_2$OCOCH=CH$_2$, fluorine content 59% by weight], 1H,1H,9H-hexadecafluorononyl acrylate [H(CF$_2$)$_8$CH$_2$OCOCH=CH$_2$, fluorine content 63% by weight], 1H-1-(trifluoromethyl)trifluoroethyl acrylate [(CF$_3$)$_2$CHOCOCH=CH$_2$, fluorine content 51% by weight], 1H,1H,3H-hexafluorobutyl acrylate [CF$_3$CHFCF$_2$CH$_2$OCOCH=CH$_2$, fluorine content 48% by weight], 2,2,2-trifluoroethyl metacrylate [CF$_3$CH$_2$OCOC(CH$_3$)=CH$_2$, fluorine content 34% by weight], 2,2,3,3,3-pentafluoropropyl methacrylate [CF$_3$CF$_2$CH$_2$OCOC(CH$_3$)=CH$_2$, fluorine content 44% by weight], 2-(perfluorobutyl)ethyl methacrylate [F(CF$_2$)$_4$CH$_2$CH$_2$OCOC(CH$_3$)=CH$_2$, fluorine content 51% by weight], 3-(perfluorobutyl)-2-hydroxypropyl methacrylate [F(CF$_2$)$_4$CH$_2$CH(OH)CH$_2$OCOC(CH$_3$)=CH$_2$, fluorine content 47% by weight], 2-(perfluorohexyl)ethyl methacrylate [F(CF$_2$)$_6$CH$_2$CH$_2$OCOC(CH$_3$)=CH$_2$, fluorine content 57% by weight], 3-(perfluorohexyl)-2-hydroxypropyl methacrylate [F(CF$_2$)$_6$CH$_2$CH(OH)CH$_2$OCOC(CH$_3$)=CH$_2$, fluorine content 53% by weight], 2-(perfluorooctyl)ethyl methacrylate [F(CF$_2$)$_8$CH$_2$CH$_2$OCOC(CH$_3$)=CH$_2$, fluorine content 61% by weight], 3-perfluorooctyl-2-hydroxypropyl methacrylate [F(CF$_2$)$_8$CH$_2$CH(OH)CH$_2$OCOC(CH$_3$)=CH$_2$, fluorine content 57% by weight], 2-(perfluorodecyl)ethyl methacrylate [F(CF$_2$)$_{10}$CH$_2$CH$_2$OCOC(CH$_3$)=CH$_2$, fluorine content 63% by weight], 2-(perfluoro-3-methylbutyl)ethyl methacrylate [(CF$_3$)$_2$CF(CF$_2$)$_2$CH$_2$CH$_2$OCOC(CH$_3$)=CH$_2$, fluorine content 55% by weight], 3-(perfluoro-3-methylbutyl)-2-hydroxypropyl methacrylate [(CF$_3$)$_2$CF(CF$_2$)$_2$CH$_2$CH(OH)CH$_2$OCOC(CH$_3$)=CH$_2$, fluorine content 51% by weight], 2-(perfluoro-5-methylhexyl)ethyl methacrylate [(CF$_3$)$_2$CF(CF$_2$)$_4$CH$_2$CH$_2$OCOC(CH$_3$)=CH$_2$, fluorine content 59% by weight], 3-(perfluoro-5-methylhexyl)-2-hydroxypropyl methacrylate [(CF$_3$)$_2$CF(CF$_2$)$_4$CH$_2$CH(OH)CH$_2$OCOC(CH$_3$)=CH$_2$, fluorine content 56% by weight], 2-(perfluoro-7-methyloctyl)ethyl methacrylate [(CF$_3$)$_2$CF(CF$_2$)$_6$CH$_2$CH$_2$OCOC(CH$_3$)=CH$_2$, fluorine content 62% by weight], 3-(perfluoro-7-methyloctyl)-2-hydroxypropyl methacrylate [(CF$_3$)$_2$CF(CF$_2$)$_6$CH$_2$CH(OH)CH$_2$OCOC(CH$_3$)=CH$_2$, fluorine content 59% by weight], 1H,1H,3H-tetrafluoropropyl methacrylate [H(CF$_2$)$_2$CH$_2$OCOC(CH$_3$)=CH$_2$, fluorine content 51% by weight], 1H,1H,5H-octafluoropentyl methacrylate [H(CF$_2$)$_4$CH$_2$OCOC(CH$_3$)=CH$_2$, fluorine content 51% by weight], 1H,1H,7H-dodecafluoroheptyl methacrylate [H(CF$_2$)$_6$CH$_2$OCOC(CH$_3$)=CH$_2$, fluorine content 57% by weight], 1H,1H,9H-hexadecafluorononyl methacrylate [H(CF$_2$)$_8$CH$_2$OCOC(CH$_3$)=CH$_2$, fluorine content 61% by weight], 1H-1-(trifluoromethyl)trifluoroethyl methacrylate [(CF$_3$)$_2$CHOCOC(CH$_3$)=CH$_2$, fluorine content 48% by weight], and 1H,1H,3H-hexafluorobutyl methacrylate [CF$_3$CHFCF$_2$CH$_2$OCOC(CH$_3$)=CH$_2$, fluorine content 46% by weight].

The above-described fluorine-containing compound having a polymerizable carbon-carbon double bond is preferably a monomer, an oligomer, or a mixture of a monomer and an oligomer. The oligomer is preferably a dimer to 20mer.

The other compound having a polymerizable carbon-carbon double bond which may be blended with the fluorine-containing compound having a polymerizable carbon-carbon double bond is not particularly limited, but preferably a (meth)acrylate monomer or oligomer, or mixture of the monomer and oligomer.

Examples of the (meth)acrylate monomer or oligomer include monomers or oligomers of urethane-based (meth)acrylates, epoxy-based (meth)acrylates, ether-based (meth)acrylates, ester-based (meth)acrylates, polycarbonate-based (meth)acrylates, and silicone-based (meth)acryl monomers or oligomers.

The (meth)acrylate oligomer may be synthesized by reacting (meth)acrylic acid with, for example, polyethylene glycol, polyoxypropylene glycol, polytetramethylene ether glycol, a bisphenol A type epoxy resin, a phenol novolac type epoxy resin, or an adduct of a polyhydric alcohol and ε-caprolactone, or by urethanizing a polyisocyanate compound with a (meth)acrylate compound having a hydroxy group.

The urethane-based (meth)acrylate oligomer may be produced by urethanizing a polyol with an isocyanate compound and a (meth)acrylate compound having a hydroxy group.

The epoxy-based (meth)acrylate oligomer may be any reaction product of (meth)acrylic acid and a compound having a glycidyl group, and is particularly preferably a reaction product of (meth)acrylic acid and a compound having a glycidyl group and a ring structure such as benzene, naphthalene, spiro, dicyclopentadiene, or tricyclodecane.

The ether-based (meth)acrylate oligomer, ester-based (meth)acrylate oligomer, and polycarbonate-based (meth)acrylate oligomer may be produced by reacting (meth)acrylic acid with a corresponding polyol (polyether polyol, polyester polyol, and polycarbonate polyol, respectively).

The silicon-containing ultraviolet or electron beam curable resin is preferably made from a silicon-containing compound having a polymerizable carbon-carbon double bond, and may be exclusively composed of the silicon-containing compound having a polymerizable carbon-carbon double bond, or may be composed of a composition containing a silicon-containing compound having a polymerizable carbon-carbon double bond and other compound having a polymerizable carbon-carbon double bond.

Preferable examples of the silicon-containing compound having a polymerizable carbon-carbon double bond include both ends-reactive silicone oils, one end-reactive silicone oils, and (meth)acryloxyalkylsilanes. The reactive silicone oil is preferably has a (meth)acryl group at one end thereof.

Specific examples of the silicon-containing compound preferably used in the present invention are shown below.

Both ends-reactive silicone oils (having functional groups shown by the following formula (1)) manufactured by Shin-Etsu Chemical Co., Ltd. are listed in Table 1.

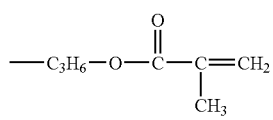
(1)

TABLE 1

| Trade name | Viscosity (mm²/s) | Functional group equivalent (g/mol) |
|---|---|---|
| X-22-164A | 25 | 860 |
| X-22-164B | 55 | 1630 |
| X-22-164C | 90 | 2370 |

(having a structure represented by the following formula (2)) manufactured by Shin-Etsu Chemical Co., Ltd. are listed in Table 2.

(wherein in the formula (2), $R^1$ is a methyl group or a butyl group, and $R^2$ is a functional group represented by the formula (1).

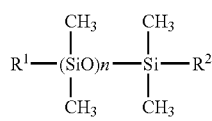
(2)

TABLE 2

| Trade name | Viscosity (mm²/s) | Functional group equivalent (g/mol) |
|---|---|---|
| X-24-8201 | 25 | 2100 |
| X-22-174DX | 60 | 4600 |
| X-22-2426 | 180 | 12000 |

Both ends methacrylate-modified silicone oils (having a structure represented by the following formula (3)) manufactured by Toray Dow Corning Silicone Co. Ltd. are listed in Table 3.

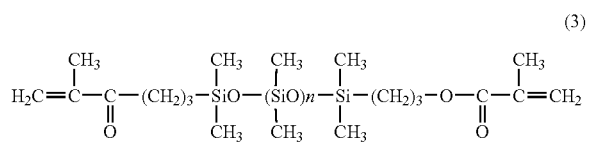
(3)

TABLE 3

| Trade name | Viscosity (cs/25° C.) | Methacryl equivalent (g/mol) | Specific gravity (25° C.) |
|---|---|---|---|
| BX16-152B | 40 | 1300 | 0.97 |
| BY16-152 | 85 | 2800 | 0.97 |
| BX2-152C | 330 | 5100 | 0.97 |

One end methacrylate-modified silicone oils (having a structure represented by the following formula (4)) manufactured by Toray Dow Corning Silicone Co. Ltd. are listed in Table 4.

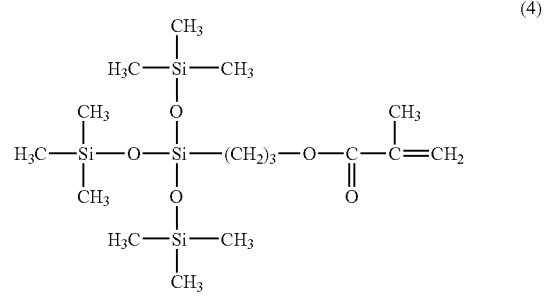
(4)

TABLE 4

| Trade name | Viscosity (cs/25° C.) | Refractive index (25° C.) | Specific gravity (25° C.) |
|---|---|---|---|
| BX16-122A | 5 | 1.417 | 0.92 |

(Meth)acryloxyalkyl silanes (having a structure represented by the following formulae (5) to (11), respectively) manufactured by Shin-Etsu Chemical Co., Ltd. are listed in Table 5.

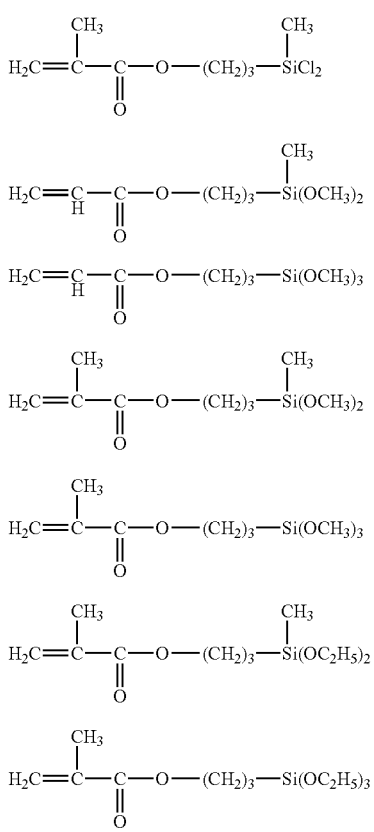

TABLE 5

| Trade name | Compound name |
|---|---|
| LS-2080 | 3-methacryloxypropyldichloromethylsilane |
| LS-2826 | 3-acryloxypropyldimethoxymethylsilane |
| LS-2827 | 3-acryloxypropyltrimethoxysilane |
| LS-3375 | 3-methacryloxypropyldimethoxymethylsilane |
| LS-3380 | 3-methacryloxypropyltrimethoxysilane |
| LS-4548 | 3-methacryloxypropyldiethoxymethylsilane |
| LS-5118 | 3-methacryloxypropyltriethoxysilane |

These silicon-containing compounds may be used alone, in combination of two or more of them, or in combination of other silicon-free compound having a carbon-carbon double bond.

In addition, the silicon-containing compound having a carbon-carbon double bond and other silicon-free compound having a carbon-carbon double bond are preferably used in the form of a monomer or oligomer, or a mixture thereof.

The other compound having a polymerizable carbon-carbon double bond which may be blended with the silicon-containing compound having a polymerizable carbon-carbon double bond is not particularly limited, but is preferably a (meth)acrylate monomer or oligomer, or a mixture thereof. The oligomer is preferably dimer to 20mer.

Examples of the (meth)acrylate monomer or oligomer include monomers or oligomers of urethane-based (meth) acrylates, epoxy-based (meth)acrylates, ether-based (meth) acrylates, ester-based (meth)acrylates, polycarbonate-based (meth)acrylates, and silicone-based (meth)acryl monomers or oligomers.

The (meth)acrylate oligomer may be synthesized by reacting (meth)acrylic acid with, for example, polyethylene glycol, polyoxypropylene glycol, polytetramethylene ether glycol, a bisphenol A type epoxy resin, a phenol novolac type epoxy resin, or an adduct of a polyhydric alcohol and ε-caprolactone, or by urethanizing a polyisocyanate compound with a (meth)acrylate compound having a hydroxy group.

The urethane-based (meth)acrylate oligomer may be produced by urethanizing a polyol with an isocyanate compound and a (meth)acrylate compound having a hydroxy group.

The epoxy-based (meth)acrylate oligomer may be any reaction product of (meth)acrylic acid and a compound having a glycidyl group, and is particularly preferably a reaction product of (meth)acrylic acid and a compound having a glycidyl group and a ring structure such as benzene, naphthalene, spiro, dicyclopentadiene, or tricyclodecane.

The ether-based (meth)acrylate oligomer, ester-based (meth)acrylate oligomer, and polycarbonate-based (meth) acrylate oligomer may be produced by reacting (meth)acrylic acid with a corresponding polyol (polyether polyol, polyester polyol, and polycarbonate polyol, respectively).

The resin layer 102 may contain, in addition to the ultraviolet or electron beam curable resin, a conductive agent to control the conductivity. The conductive agent is not particularly limited, but is preferably a carbon-based conductive agent which provides a high level of conductivity in a small amount. Specific examples of the carbon-based conductive agent include: carbon black for rubber such as Ketjen Black, acetylene black, SAF, ISAF, HAF, FEF, GPF, SRF, FT, and MT; carbon black for ink such as carbon black oxide; pyrolytic carbon black; and graphite. Among them, carbon black is more preferable.

The content of the carbon-based conductive agent in an ultraviolet curable resin is preferably 30 parts by weight or less, for example, in the range of 1 to 20 parts by weight, specifically 1 to 10 parts by weight, and most preferably 2 to 5 parts by weight with reference to 100 parts by weight of the ultraviolet curable resin. In particular, in cases where carbon black is used, the content thereof is preferably in the range of 1 to 30 parts by weight with reference to 100 parts by weight of the ultraviolet curable resin. If the content of the conductive agent is too low, sufficient conductivity may not be achieved. On the other hand, if the content is too high, the resin layer 102 may be stiffened to become brittle, and leaks may occur during use because of excessive conductivity, in addition, when a carbon-based conductive agent is used, the curing reaction may not sufficiently proceed.

The content of the carbon-based conductive agent in an electron beam curable resin is preferably 100 parts by weight or less, for example, in the range of 1 to 100 parts by weight, specifically 1 to 80 parts by weight, and most preferably 10 to 50 parts by weight with reference to 100 parts by weight of the electron beam curable resin. In particular, in cases where carbon black is used, the content thereof is preferably in the range of 5 to 30 parts by weight with reference to 100 parts by weight of the electron beam curable resin. If the content of the conductive agent is too low, conductivity is insufficiently achieved. On the other hand, if the content is too high, the resin layer 102 may be stiffened to become brittle, and leaks may occur during use because of excessive conductivity.

The conductive agent may be used in combination of two or more of them. In this case, the conductivity is stably exhibited against variations in the voltage applied and environments. Specifically, the carbon-based conductive agent may be used in combination with, for example, other carbon-free electronic conductive agent or ionic conductive agent.

In cases where an ionic conductive agent is used in combination with the carbon-based conductive agent, the content of the ionic conductive agent in the resin layer 102 is preferably 20 parts by weight or less, specifically in the range of 0.01 to 20 parts by weight, and most preferably 1 to 10 parts by weight with reference to 100 parts by weight of the ultraviolet or electron beam curable resin.

Examples of the ionic conductive agent include: organic ionic conductive agents such as perchlorates, chlorates, hydrochlorides, bromates, iodates, borofluorides, sulfates, alkyl sulfates, carboxylates, and sulfonates of tetraethyl ammonium, tetrabutyl ammonium, dodecyltrimethyl ammonium such as lauryltrimethyl ammonium, hexadecyltrimethyl ammonium, octadecyltrimethyl ammonium such as stearyltrimethyl ammonium, benzyltrimethyl ammonium, and modified aliphatic dimethylethyl ammonium; and inorganic ionic conductive agents such as perchlorates, chlorates, hydrochlorides, bromates, iodates, borofluorides, trifluoromethyl sulfates, and sulfonates of alkali metals or alkaline earth metals such as lithium, sodium, calcium, and magnesium.

In cases where an electronic conductive agent is used in combination with the carbon-based conductive agent, the content of the electronic conductive agent in the resin layer 102 is preferably 100 parts by weight or less, for example in the range of 1 to 100 parts by weight, specifically in the range of 1 to 80 parts by weight, and most preferably 10 to 50 parts by weight with reference to 100 parts by weight of the ultraviolet or electron beam curable resin.

Examples of the carbon-free electronic conductive agent include fine particles of a metal oxide such as ITO, tin oxide, titanium oxide, or zinc oxide, oxides of a metal such as nickel, copper, silver, or germanium, and transparent whiskers such as conductive titanium oxide whiskers or conductive barium titanate whiskers.

The resin layer 102 is preferably formed by applying a coating liquid containing the constituents of the ultraviolet or electron beam curable resin, a conductive agent, and other additives to the belt base 101, and then curing the coating by irradiation with ultraviolet light or electron beams. The coating liquid is preferably solvent-free, or may contain a solvent which is highly volatile at normal temperature. The method requires no large-scale facility or space for drying which is usually required when the layer is formed by drying and curing the coating by heat or hot air. In addition, the method suppresses variations of film formation caused by difficulty in the control of the drying process to allow the formation of the resin layer with high precision.

In accordance with the situation, the method for applying the coating liquid may be appropriately selected from, for example, a dip method in which the belt base is dipped in the coating liquid, a spray coat method, and a roll coat method.

The light source for emitting ultraviolet light may be any commonly used lamp such as a mercury lamp, a high pressure mercury lamp, an ultrahigh pressure mercury lamp, a metal halide lamp, or a xenon lamp. The conditions for ultraviolet irradiation may be appropriately selected in accordance with the type and the coating weight of the ultraviolet curable resin, but the illumination and cumulative luminous energy are preferably 100 to 700 mW/cm$^2$ and about 200 to 3000 mJ/cm$^2$, respectively.

The thickness of the resin layer 102 is not particularly limited, but is usually 1 to 30 μm, preferably 2 to 20 μm, and particularly preferably about 3 to 10 μm. If the thickness is too small, the belt surface may be insufficiently electrified because of friction during long-term use. On the other hand, if the thickness is too great, the belt surface may be stiffened to damage toner, which may result in adhesion of the toner to an image forming body and others to cause problems such as a defective image.

In the present invention, the important thing is only that the resin layer 102 is provided on the belt base 101. The structure of the belt base 101 is not particularly limited. The base resin material of the belt base 101 may be appropriately selected from known materials, and specific examples thereof include thermoplastic polyamide (PA), thermoplastic polyarylate (PAR), thermoplastic polyacetal (POM), thermoplastic polyalkylene naphthalate resins such as a thermoplastic polyethylene naphthalate (PEN) resin and a thermoplastic polybutylene naphthalate (PBN) resin, and thermoplastic polyalkylene terephthalate resins such as a thermoplastic polyethylene terephthalate (PET) resin and a thermoplastic polybutylene terephthalate (PBT) resin. In addition, a polymer alloy or polymer blend composed of one or more of the above resins, and a polymer alloy or polymer blend composed of one or more of the above resins and other thermoplastic resin, specifically a thermoplastic elastomer may also be used.

Thermoplastic polyamide (PA) is one of the oldest commonly-used resins due to its excellent abrasion resistance. PA is also excellent in strength, impact resistance, and other properties, and readily available at the market. There are some types of PA, and particularly preferable is nylon 12 (hereinafter referred to as "PA12") such as RILSAN AESN O TL (trade name, manufactured by Toray Industries, Inc.), DIAMIDE L 2101 and DIAMIDE L1940 (trade name, manufactured by Daicel Huels Ltd.), and 3024U (trade name, manufactured by Ube Industries, Ltd.). PA12 is superior to other PA resins in dimensional stability against environment variations. PA6 is also preferable. When one of the thermoplastic polyamide is used as the base resin material of the belt base 101, a conductive endless belt having excellent strength, specifically bending resistance, is provided without variation in the resistance. The PA12 preferably has a number average molecular weight of 7,000 to 100,000, more preferably 13000 to 40000.

Preferable examples of the polymer alloy of PA with a thermoplastic elastomer include a block copolymer alloy of PA12 and a thermoplastic polyether. The alloy provides dimensional stability, in addition, favorably improves low temperature properties. The polymer alloy of PA12 with a thermoplastic polyether is also available at the market, and typical examples thereof include DIAMIDE X4442 (trade name, manufactured by Daicel Huels Ltd.).

The thermoplastic elastomer suitable for a polymer blend with PA is commonly a polymer having a Young's modulus of 98,000 N/cm$^2$ or less, preferably 980 to 49,000 N/cm$^2$, and examples thereof include polyester-based, polyamide-based, polyether-based, polyolefin-based, polyurethane-based, styrenic, acrylic, and polydiene-based elastomers. When the thermoplastic elastomer is used for the polymer blend, the number of folding actions to failure is increased, and crack resistance is improved. A polymer blend of PA 12 with a thermoplastic elastomer is also available at the market, and examples thereof include DIAMIDE E1947 (trade name, manufactured by Daicel Huels Ltd.).

In the present invention, the mixing ratio between PA and a thermoplastic elastomer in a polymer alloy or polymer blend is, for example, 100 parts by weight or less of a thermoplastic elastomer with reference to 100 parts of PA12.

Thermoplastic polyarylate is an engineering plastic having excellent impact resistance and dimensional stability, and good elastic recovery properties. It is readily available at the market, and typical examples thereof include U-100 (manufactured by Unitika, Ltd). When the PAR is used as the base material of a conductive endless belt, a conductive endless belt having excellent strength, specifically bending resistance and creep resistance, and high dimensional precision is provided without variation in the resistance.

Preferable examples of the polymer alloy or polymer blend of PAR include a polymer alloy with thermoplastic polycarbonate (PC) or thermoplastic polyethylene terephthalate (PET). The polymer alloy and polymer blend of PAR with a thermoplastic resin is also available at the market, and typical examples thereof include P-3001 (manufactured by Unitika, Ltd.) as an alloy of PAR with PC, and U-8000 (manufactured by Unitika, Ltd.) as an alloy of PAR with PET.

The thermoplastic polyacetal may be a homopolymer or copolymer, and is preferably a copolymer from the viewpoint of heat stability. POM is an engineering plastic frequently used for plastic gears and others because it has well-balanced strength, abrasion resistance, dimensional stability, and moldability. It is readily available at the market, and typical examples thereof include TENAC 2010 (trade name, manufactured by Asahi Kasei Corporation), and DURACON M25-34 (trade name, manufactured by Polyplastic Co., Ltd.). When the POM is used as the base material of a conductive endless belt, a conductive endless belt having excellent strength, specifically bending resistance and creep resistance, and high dimensional precision is provided without variation in the resistance.

Preferable examples of the polymer alloy of POM include a polymer alloy with thermoplastic polyurethane, which provides excellent impact resistance in addition to the above-described properties. The polymer alloy of POM with thermoplastic polyurethane is also available at the market, and typical examples thereof include TENAC 4012 (trade name, manufactured by Asahi Kasei Corporation).

Examples of preferable thermoplastic elastomers for the polymer blend with POM include the above-described ones listed for PA. Also in this case, the blending with the thermoplastic elastomer increases the number of folding actions to failure, and improves crack resistance.

Thermoplastic polyarylate is an engineering plastic having excellent impact resistance, dimensional stability, and weather resistance, and good elastic recovery properties. It is readily available at the market, and specific examples thereof include a thermoplastic polyethylene naphthalate (PEN) resin and a thermoplastic polybutylene naphthalate (PBN) resin. Among them, a thermoplastic PBN resin is preferable.

Specific examples of the thermoplastic polyalkylene terephthalate resin include a thermoplastic polyethylene terephthalate (PET) resin and a thermoplastic polybutylene terephthalate (PBT) resin. Among them, a thermoplastic PET resin is preferable. The thermoplastic PET resin is excellent in heat resistance, light resistance, abrasion resistance, and other properties.

The belt base 101 contains a conductive agent to adjust the conductivity. The conductive agent may be appropriately selected from those listed for the resin layer 102, and is not particularly limited. The content is preferably 0.01 to 30 parts by weight, and more preferably about 0.1 to 20 parts by weight with reference to 100 parts by weight of the base resin material. In the present invention, the conductivity of the whole belt is adjusted primarily by the conductive agent contained in the belt base 101, and secondarily by the conductive agent contained in the resin layer 102.

In addition to the above-described components, the belt base 101 may contain other functional components as appropriate within the range which does not impair the effect of the present invention. Examples of the components include various fillers, coupling agents, antioxidants, lubricants, surface treatment agents, pigments, ultraviolet absorbing agents, anti-static agents, dispersants, neutralizing agents, foaming agents, crosslinking agents. In addition, a coloring agent may be added for coloring.

The thickness of the conductive endless belt of the present invention is appropriately selected in accordance with the form of the transfer/transport belt, intermediate transfer member, or the like, and is preferably in the range of 50 to 200 µm as a total thickness of the belt base 101 and the resin layer 102. The surface roughness of the belt is preferably 10 µm or less, specifically 6 µm or less, and further preferably 3 µm or less in terms of JIS ten point average roughness Rz. The volume resistivity is preferably adjusted within the range of about 102 Ωcm to 1013 Ωcm by appropriately adding a conductive agent to the resin layer 102 and/or belt base 101 as described above.

As indicated by a dashed line in FIG. 1, the conductive endless belt of the present invention may have an engaging portion on the surface in contact with a driving member such as the driving roller 9 in the image forming apparatus in FIG. 2 or the driving roller 30 in FIG. 3 so as to engage with another engaging portion (not shown) formed on the driving member. When the conductive endless belt of the present invention has the engaging portion and travels with the engaging portion engaged with another engaging portion (not shown) formed on a driving member, the conductive endless belt is prevented from being shifted in the width direction.

In this case, the engaging portion is not particularly limited as to its form, but preferably, as shown in FIG. 1, in the form of continuous protrusion along the circumferential direction (rotation direction) of the belt, the protrusion being engaged with a groove formed on the circumference surface of a driving member such as a driving roller along the circumferential direction.

FIG. 1(a) shows an example in which one continuous protrusion is provided as the engaging portion. Alternatively, the engaging portion may be composed of a plurality of protrusions aligned along the circumferential direction (rotation direction) of the belt, or two or more engaging portions may be provided (FIG. 1(b)). In addition, the engaging portion may be provided in the central portion in the width direction of the belt. The engaging portion may be, instead of the protrusion shown in FIG. 1, a groove provided along the circumferential direction (rotation direction) of the belt, the belt being engaged with a protrusion formed on the circumference surface of a drive member such as a drive roller along the circumferential direction thereof.

Examples of the image forming apparatus of the present invention employing the conductive endless belt of the present invention include, but not limited to, a tandem system one as shown in FIG. 2, a intermediate transfer system one as shown in FIG. 3, or an tandem intermediate transfer system one as shown in FIG. 4. In the apparatus shown in FIG. 3, a voltage may be appropriately applied from the power supply 61 to the driving roller or driving gear to rotate the intermediate transfer member 20 of the present invention, wherein the conditions for applying the voltage may be appropriately selected from, for example, application of a direct current alone, or application of a direct current superimposed by an alternative current.

The method of producing the conductive endless belt of the present invention includes steps of applying a solvent-free coating liquid containing an ultraviolet or electron beam curable resin to the belt base 101, and curing the coating by irradiation with ultraviolet light or electron beams to form the resin layer 102. The method including the step of applying the solvent-free coating liquid requires no large-scale facility or space which has conventionally been required. In addition, the method suppresses variations of film formation to allow the formation of the resin layer 102 at low cost and with high precision. In the producing method of the present invention, no specific limitation is placed on the steps included therein except for the step of forming the resin layer 102. For example, the belt base 101 may be made by kneading a resin composition composed of functional components such as a base resin material and a conductive agent using a biaxial kneader, and extrusion molding the thus obtained paste using a ring-shaped dice.

Alternatively, a powder coating method such as electrostatic coating, a dipping method, or a centrifugal casting method is also preferable.

BEST MODE FOR CARRYING OUT THE INVENTION

The present invention is illustrated below with reference to the following examples, but the present invention is not limited to the examples.

Examples 1-1 to 1-11, Comparative Examples 1-1 and 1-2

Conductive endless belts of Examples and Comparative Examples were made according to the formula listed in Tables 6 to 8. Specifically, the ingredients of the belt base listed in the tables were melt-kneaded using a biaxial kneader, and the thus obtained paste was extrusion molded using a ring-shaped dice to produce the belt base 101 having an inside diameter of 220 mm, a thickness of 100 μm, and a width of 250 mm. Thereafter, a solvent-free resin layer coating liquid composed of the ingredients listed in the tables was applied to the belt base 101 using a roll coater in a film thickness listed in Tables 9 to 11. With rotating the coated belt 100, the coating of the resin layer 102 was irradiated with ultraviolet light for curing using UNICURE UVH-0252C (manufactured by Ushio Inc.) at an illumination of 400 mW and a cumulative luminous energy of 1000 mJ/cm$^2$, thus the conductive endless belt 100 was obtained. The resin layer 102 was not formed in Comparative Examples 1-1 and 1-2.

TABLE 6

| | | | Example 1-1 | Example 1-2 | Example 1-3 | Example 1-4 | Example 1-5 | Example 1-6 |
|---|---|---|---|---|---|---|---|---|
| Belt base | Resin | PA12*[1] | 100 | — | 100 | 100 | 100 | 100 |
| | | PBN*[2] | — | 80 | — | — | — | — |
| | | PET*[3] | — | 20 | — | — | — | — |
| | Conductive agent | Carbon black*[4] | 18 | 15 | 18 | 18 | 18 | 18 |
| Resin layer | Base resin*[5] | | 50 | 50 | 50 | 50 | 50 | 50 |
| | Reactive diluent*[6] | (1) | 50 | 50 | 50 | 50 | 50 | 50 |
| | | (2) | — | — | — | — | — | — |
| | | (3) | — | — | — | — | — | — |
| | Polymerization initiator*[7] | (1) | 5 | 5 | 5 | 5 | 5 | 2.5 |
| | | (2) | — | — | — | — | — | 2.5 |
| | Conductive agent*[8] | (1) | — | — | — | — | 1 | 3 |
| | | (2) | — | — | — | — | — | — |
| | | (3) | — | — | 2 | — | — | — |
| | | (4) | — | — | — | 40 | — | — |
| | Additive*[9] | | — | — | — | — | — | — |

TABLE 7

| | | | Example 1-7 | Example 1-8 | Example 1-9 | Example 1-10 | Example 1-11 |
|---|---|---|---|---|---|---|---|
| Belt base | Resin | PA12*[1] | 100 | 100 | 100 | 100 | 100 |
| | | PBN*[2] | — | — | — | — | — |
| | | PET*[3] | — | — | — | — | — |
| | Conductive agent | Carbon black*[4] | 18 | 18 | 18 | 18 | 18 |
| Resin layer | Base resin*[5] | | 50 | 50 | 50 | 50 | 50 |
| | Reactive diluent*[6] | (1) | 50 | 50 | 50 | 50 | 50 |
| | | (2) | — | — | — | — | — |
| | | (3) | — | — | 10 | — | 10 |
| | Polymerization initiator*[7] | (1) | 2.5 | 5 | 2.5 | 2.5 | 2.5 |
| | | (2) | 2.5 | — | 2.5 | 2.5 | 2.5 |
| | Conductive agent*[8] | (1) | — | 1 | 3 | 3 | 3 |
| | | (2) | 30 | — | — | — | — |
| | | (3) | — | 1 | — | — | — |
| | | (4) | — | — | — | — | — |
| | Additive*[9] | | — | — | — | 10 | — |

TABLE 8

|  |  |  | Comparative Example 1-1 | Comparative Example 1-2 |
|---|---|---|---|---|
| Belt base | Resin | PA12*[1] | 100 | — |
|  |  | PBN*[2] | — | 80 |
|  |  | PET*[3] | — | 20 |
|  | Conductive agent | Carbon black*[4] | 18 | 15 |
| Resin layer | Base resin*[5] |  | — | — |
|  | Reactive diluent*[6] | (1) | — | — |
|  |  | (2) | — | — |
|  |  | (3) | — | — |
|  | Polymerization initiator*[7] | (1) | — | — |
|  |  | (2) | — | — |
|  | Conductive agent*[8] | (1) | — | — |
|  |  | (2) | — | — |
|  |  | (3) | — | — |
|  |  | (4) | — | — |
|  | Additive*[9] |  | — | — |

Asterisks in Tables 6 to 8 denote the followings.
*[1]PA12: manufactured by Ube Industries, Ltd., trade name 3024U
*[2]PBN: manufactured by Teijin Chemicals Ltd., trade name TQB-OT
*[3]PET: manufactured by Unitika, Ltd., trade name SA-1206
*[4]Carbon black: manufactured by Denki Kagaku Kogyo Kabushiki Kaisha, trade name DENKA BLACK
*[5]Base resin: urethane acrylate oligomer, manufactured by Kyoeisha Chemical Co., Ltd., article number UF8001
*[6]Reactive diluent:
(1) Methoxytriethyleneglycol acrylate, manufactured by Kyoeisha Chemical Co., Ltd., article number MTG-A
(2) Isoamyl acrylate
(3) 2-(perfluorooctyl)ethyl acrylate
*[7]Polymerization initiator:
(1) Acylphosphine oxide, manufactured by Ciba Specialty Chemicals, article number IRGACURE 819 (maximum absorption wavelength: 430 nm)
(2) α-hydroxyacetophenone, manufactured by Ciba Specialty Chemicals, article number IRGACURE 184 (maximum absorption wavelength: 300 nm)
*[8]Conductive agent:
(1) Carbon black, trade name ketchen EC
(2) Carbon black, trade name Printex 35
(3) Sodium perchlorate
(4) ITO fine particles
*[9]Additive: manufactured by Nof Corporation, trade name MODIPER F200

The conductive endless belts obtained in Examples 1-1 to 1-11 and Comparative Examples 1-1 and 1-2 were subjected to measurements in accordance with the following procedures.

<Measurement of Volume Resistivity>

The volume resistivity of the belts was measured at a measuring voltage of 100 V, a temperature of 23° C., and a relative humidity of 50% using a resistance meter R8340A connected to a sample chamber R12704A manufactured by Advantest Corporation. The volume resistivity of the resin layer was determined by applying a coating liquid to a copper plate, curing the coating, and then measuring the resistance between the copper plate and the measuring electrode.

<Variation in Resistance>

The conductive endless belts of Examples and Comparative Examples were pressed against a metal drum under a pressure of 500 g, and a voltage of 100 V was applied to the space between the belt and the drum with rotating the belt. The difference between the maximum resistance and the minimum resistance was determined and defined as the variation in the resistance.

<Image Properties>

Each of the belts was mounted on the tandem system image forming apparatus including a transfer/transport belt shown in FIG. 2, and images printed in the initial stage and after printing 100,000 sheets were evaluated as to their properties. The results of the evaluations are summarized in Tables 9 to 11

TABLE 9

|  |  |  | Example 1-1 | Example 1-2 | Example 1-3 | Example 1-4 | Example 1-5 | Example 1-6 |
|---|---|---|---|---|---|---|---|---|
| Resin layer coating properties |  | Volume resistance (Ωcm) | $10^{13}$ | $10^{13}$ | $10^{10}$ | $10^{8}$ | $10^{10}$ | $10^{6}$ |
|  |  | Film thickness (μm) | 2 | 2 | 30 | 10 | 10 | 5 |
| Belt properties |  | Volume resistance (Ωcm) | $10^{10}$ | $10^{10}$ | $10^{10}$ | $10^{9}$ | $10^{10}$ | $10^{8}$ |
|  |  | Variation in resistance | ⊚ | ⊚ | ⊚ | ○ | Δ | ○ |
| Machine performance | Initial performance | Image density | ○ | ○ | ○ | ○ | ○ | ⊚ |
|  |  | Halftone reproducibility | ○ | ○ | ○ | ○ | ○ | ⊚ |
|  |  | Image irregularity | ○ | ○ | ○ | ○ | Δ | ○ |
|  |  | Ghost | Δ | Δ | ○ | ○ | ○ | ○ |
|  |  | Toner adhesion | ○ | ○ | ○ | ○ | ○ | ○ |
|  | After printing 100,000 sheets | Image density | ○ | ○ | ○ | ○ | ○ | ⊚ |
|  |  | Halftone reproducibility | ○ | ○ | ○ | ○ | ○ | ⊚ |
|  |  | Image irregularity | ○ | ○ | ○ | ○ | Δ | ○ |
|  |  | Ghost | Δ | Δ | ○ | ○ | ○ | ○ |
|  |  | Toner adhesion | Δ | Δ | ○ | ○ | ○ | ○ |

TABLE 10

|  |  | Example 1-7 | Example 1-8 | Example 1-9 | Example 1-10 | Example 1-11 |
|---|---|---|---|---|---|---|
| Resin layer coating properties | Volume resistance (Ωcm) | $10^2$ | $10^9$ | $10^6$ | $10^6$ | $10^6$ |
|  | Film thickness (μm) | 2 | 10 | 5 | 5 | 5 |
| Belt properties | Volume resistance (Ωcm) | $10^8$ | $10^9$ | $10^8$ | $10^8$ | $10^8$ |
|  | Variation in resistance | ○ | ○ | ○ | ○ | ○ |
| Machine performance | Initial performance | Image density | ◎ | ◎ | ◎ | ◎ | ◎ |
|  |  | Halftone reproducibility | ◎ | ◎ | ◎ | ◎ | ◎ |
|  |  | Image irregularity | ○ | ○ | ○ | ○ | ○ |
|  |  | Ghost | ○ | ○ | ○ | ○ | ○ |
|  |  | Toner adhesion | ○ | ○ | ○ | ○ | ○ |
|  | After printing 100,000 sheets | Image density | ◎ | ◎ | ◎ | ◎ | ◎ |
|  |  | Halftone reproducibility | ◎ | ◎ | ◎ | ◎ | ◎ |
|  |  | Image irregularity | ○ | ○ | ○ | ○ | ○ |
|  |  | Ghost | ○ | ○ | ○ | Δ | ○ |
|  |  | Toner adhesion | Δ | ○ | ◎ | ◎ | ◎ |

TABLE 11

|  |  | Comparative Example 1-1 | Comparative Example 1-2 |
|---|---|---|---|
| Resin layer coating properties | Volume resistance (Ωcm) | $10^8$ | $10^8$ |
|  | Film thickness (μm) | NONE | NONE |
| Belt properties | Volume resistance (Ωcm) | $10^8$ | $10^8$ |
|  | Variation in resistance | ○ | ○ |
| Machine performance | Initial performance | Image density | ○ | ○ |
|  |  | Halftone reproducibility | ○ | ○ |
|  |  | Image irregularity | Δ | Δ |
|  |  | Ghost | ○ | ○ |
|  |  | Toner adhesion | ○ | ○ |
|  | After printing 100,000 sheets | Image density | ○ | ○ |
|  |  | Halftone reproducibility | Δ | Δ |
|  |  | Image irregularity | Δ | Δ |
|  |  | Ghost | X | X |
|  |  | Toner adhesion | X | X |

Examples 2-1 to 2-11, Comparative Examples 2-1 and 2-2

Conductive endless belts of Examples and Comparative Examples were made according to the formula listed in Tables 12 to 14. Specifically, the ingredients of the belt base listed in the tables were melt-kneaded using a biaxial kneader, and the thus obtained paste was extrusion molded using a ring-shaped dice to produce the belt base 101 having an inside diameter of 220 mm, a thickness of 100 μm, and a width of 250 mm. Thereafter, a solvent-free resin layer coating liquid composed of the ingredients listed in the tables was applied to the belt base 101 using a roll coater in a film thickness listed in Tables 12 to 14. With rotating the coated belt 100, the coating of the resin layer 102 was irradiated with electron beams for curing using Min-EB (manufactured by Ushio Inc.) under conditions of an applied voltage of 30 kV, a tube current of 300 μA, an irradiation distance of 100 mm, a nitrogen atmosphere of 760 mmTorr, and an irradiation time of 1 minute, thus the conductive endless belt 100 was obtained. The resin layer 102 was not formed in Comparative Examples 1-1 and 1-2.

TABLE 12

|  |  |  | Example 2-1 | Example 2-2 | Example 2-3 | Example 2-4 | Example 2-5 | Example 2-6 |
|---|---|---|---|---|---|---|---|---|
| Belt base | Resin | PA12*1 | 100 | — | 100 | 100 | 100 | 100 |
|  |  | PBN*2 | — | 80 | — | — | — | — |
|  |  | PET*3 | — | 20 | — | — | — | — |
|  | Conductive agent | Carbon black*4 | 18 | 15 | 18 | 18 | 18 | 18 |
| Resin layer | Base resin*5 |  | 50 | 50 | 50 | 50 | 50 | 50 |
|  | Reactive diluent*6 | (1) | 50 | 50 | 50 | 50 | 50 | 50 |
|  |  | (2) | — | — | — | — | — | — |
|  |  | (3) | — | — | — | — | — | — |
|  | Conductive agent*7 | (1) | — | — | — | — | 1 | — |
|  |  | (2) | — | — | — | — | — | 10 |
|  |  | (3) | — | — | 3 | — | — | — |
|  |  | (4) | — | — | — | 38 | — | — |
|  | Additive*8 |  | — | — | — | — | — | — |

TABLE 13

|  |  |  | Example 2-7 | Example 2-8 | Example 2-9 | Example 2-10 | Example 2-11 |
|---|---|---|---|---|---|---|---|
| Belt base | Resin | PA12*¹ | 100 | 100 | 100 | 100 | 100 |
|  |  | PBN*² | — | — | — | — | — |
|  |  | PET*³ | — | — | — | — | — |
|  | Conductive agent | Carbon black*⁴ | 18 | 18 | 18 | 18 | 18 |
| Resin layer | Base resin*⁵ |  | 50 | 50 | 50 | 50 | 50 |
|  | Reactive diluent*⁶ | (1) | 50 | 50 | 50 | 50 | 50 |
|  |  | (2) | — | — | — | — | — |
|  |  | (3) | — | — | 10 | — | 10 |
|  | Conductive agent*⁷ | (1) | — | 1 | 3 | 3 | 3 |
|  |  | (2) | 30 | — | — | — | — |
|  |  | (3) | — | 2 | — | — | — |
|  |  | (4) | — | — | — | — | — |
|  | Additive*⁸ |  | — | — | — | 10 | — |

TABLE 14

|  |  |  | Comparative Example 2-1 | Comparative Example 2-2 |
|---|---|---|---|---|
| Belt base | Resin | PA12*¹ | 100 | — |
|  |  | PBN*² | — | 80 |
|  |  | PET*³ | — | 20 |
|  | Conductive agent | Carbon black*⁴ | 18 | 15 |
| Resin layer | Base resin*⁵ |  | — | — |
|  | Reactive diluent*⁶ | (1) | — | — |
|  |  | (2) | — | — |
|  |  | (3) | — | — |
|  | Conductive agent*⁷ | (1) | — | — |
|  |  | (2) | — | — |
|  |  | (3) | — | — |
|  |  | (4) | — | — |
|  | Additive*⁸ |  | — | — |

Asterisks in Tables 12 to 14 denote the followings.
*¹PA12: manufactured by Ube Industries, Ltd., trade name 3024U
*²PBN: manufactured by Teijin Chemicals Ltd., trade name TQB-OT
*³PET: manufactured by Unitika, Ltd., trade name SA-1206
*⁴Carbon black: manufactured by Denki Kagaku Kogyo Kabushiki Kaisha, trade name DENKA BLACK
*⁵Base resin: urethane acrylate oligomer, manufactured by Kyoeisha Chemical Co., Ltd., article number UV3200
*⁶Reactive diluent:
(1) 1,9-nonanediol dimethacrylate, manufactured by Kyoeisha Chemical Co., Ltd., article number 1,9ND-A
(2) Isoamyl acrylate
(3) 2-(perfluorooctyl)ethyl acrylate
*⁷Conductive agent:
(1) Carbon black, trade name ketchen EC
(2) Carbon black, trade name Printex 35
(3) Sodium perchlorate
(4) ITO fine particles
*⁸Additive: manufactured by Nof Corporation, trade name MODIPER F200

The conductive endless belts obtained in Examples 2-1 to 2-11 and Comparative Examples 2-1 and 2-2 were subjected to measurements in accordance with the following procedures.

<Measurement of Volume Resistivity>

The volume resistivity of the belts was measured at a measuring voltage of 100 V, a temperature of 23° C., and a relative humidity of 50% using a resistance meter R8340A connected to a sample chamber R12704A manufactured by Advantest Corporation. The volume resistivity of the resin layer was determined by applying a coating liquid to a copper plate, curing the coating, and then measuring the resistance between the copper plate and the measuring electrode.

<Variation in Resistance>

The conductive endless belts of Examples and Comparative Examples were pressed against a metal drum under a pressure of 500 g, and a voltage of 100 V was applied to the space between the belt and the drum with rotating the belt. The difference between the maximum resistance and the minimum resistance was determined and defined as the variation in the resistance.

Each of the belts was mounted on the tandem system image forming apparatus including a transfer/transport belt shown in FIG. 2, and images printed in the initial stage and after printing 100,000 sheets were evaluated as to their properties. The results of the evaluations are summarized in Tables 15 to 17.

TABLE 15

|  |  |  | Example 2-1 | Example 2-2 | Example 2-3 | Example 2-4 | Example 2-5 | Example 2-6 |
|---|---|---|---|---|---|---|---|---|
| Resin layer coating properties |  | Volume resistance ($\Omega$cm) | $10^{13}$ | $10^{13}$ | $10^{10}$ | $10^8$ | $10^{10}$ | $10^5$ |
|  |  | Film thickness (μm) | 3 | 3 | 10 | 30 | 10 | 3 |
| Belt properties |  | Volume resistance ($\Omega$cm) | $10^{10}$ | $10^{10}$ | $10^{10}$ | $10^9$ | $10^{10}$ | $10^8$ |
|  |  | Variation in resistance | ⊚ | ⊚ | ⊚ | ○ | Δ | ○ |
| Machine performance | Initial performance | Image density | ○ | ○ | ○ | ○ | ○ | ⊚ |
|  |  | Halftone reproducibility | ○ | ○ | ○ | ○ | ○ | ○ |
|  |  | Image irregularity | ○ | ○ | ○ | ○ | Δ | ○ |

TABLE 15-continued

|  |  | Example 2-1 | Example 2-2 | Example 2-3 | Example 2-4 | Example 2-5 | Example 2-6 |
|---|---|---|---|---|---|---|---|
| After printing 100,000 sheets | Ghost | Δ | Δ | ○ | ○ | ○ | ○ |
| | Toner adhesion | ○ | ○ | ○ | ○ | ○ | ○ |
| | Image density | ○ | ○ | ○ | ○ | ○ | ◎ |
| | Halftone reproducibility | ○ | ○ | ○ | ○ | ○ | ○ |
| | Image irregularity | ○ | ○ | ○ | ○ | Δ | ○ |
| | Ghost | Δ | Δ | ○ | ○ | ○ | ○ |
| | Toner adhesion | Δ | Δ | ○ | ○ | ○ | ○ |

TABLE 16

|  |  |  | Example 2-7 | Example 2-8 | Example 2-9 | Example 2-10 | Example 2-11 |
|---|---|---|---|---|---|---|---|
| Resin layer coating properties | | Volume resistance (Ωcm) | $10^2$ | $10^8$ | $10^6$ | $10^6$ | $10^6$ |
| | | Film thickness (μm) | 2 | 8 | 5 | 5 | 5 |
| Belt properties | | Volume resistance (Ωcm) | $10^8$ | $10^8$ | $10^8$ | $10^8$ | $10^8$ |
| | | Variation in resistance | ○ | ○ | ○ | ○ | ○ |
| Machine performance | Initial performance | Image density | ◎ | ◎ | ◎ | ◎ | ◎ |
| | | Halftone reproducibility | ◎ | ◎ | ◎ | ◎ | ◎ |
| | | Image irregularity | ○ | ○ | ○ | ○ | ○ |
| | | Ghost | ○ | ○ | ○ | ○ | ○ |
| | | Toner adhesion | ○ | ○ | ○ | ○ | ○ |
| | After printing 100,000 sheets | Image density | ◎ | ◎ | ◎ | ◎ | ◎ |
| | | Halftone reproducibility | ◎ | ◎ | ◎ | ◎ | ◎ |
| | | Image irregularity | ○ | ○ | ○ | ○ | ○ |
| | | Ghost | ○ | ○ | ○ | Δ | ○ |
| | | Toner adhesion | Δ | ○ | ◎ | ◎ | ◎ |

TABLE 17

|  |  |  | Comparative Example 2-1 | Comparative Example 2-2 |
|---|---|---|---|---|
| Resin layer coating properties | | Volume resistance (Ωcm) | $10^8$ | $10^8$ |
| | | Film thickness (μm) | NONE | NONE |
| Belt properties | | Volume resistance (Ωcm) | $10^8$ | $10^8$ |
| | | Variation in resistance | ○ | ○ |
| Machine performance | Initial performance | Image density | ○ | ○ |
| | | Halftone reproducibility | ○ | ○ |
| | | Image irregularity | Δ | Δ |
| | | Ghost | ○ | ○ |
| | | Toner adhesion | ○ | ○ |
| | After printing 100,000 sheets | Image density | ○ | ○ |
| | | Halftone reproducibility | Δ | Δ |
| | | Image irregularity | Δ | Δ |
| | | Ghost | X | X |
| | | Toner adhesion | X | X |

The invention claimed is:

1. A conductive endless belt used as a transfer/transport conductive endless belt for a tandem system in which the conductive endless belt is circularly driven by a drive member so as to transport a recording medium held by the belt through electrostatic attraction to four differing image forming bodies, in which the toner images are sequentially transferred onto the recording medium, the conductive endless belt comprising a belt base having thereon a resin layer, the resin layer containing a cured ultraviolet or electron beam curable resin, wherein the ultraviolet curable resin contains an ultraviolet polymerization initiator.

2. A conductive endless belt used as an intermediate transfer member which is disposed between an image forming body and a recording medium, is circularly driven by a drive member, transfers a toner image from the surface of the image forming body onto the surface of the belt to temporarily hold it thereon, and transfers the toner image onto a recording medium, the conductive endless belt comprising a belt base having thereon a resin layer, the resin layer containing a cured ultraviolet or electron beam curable resin, wherein the ultraviolet curable resin contains an ultraviolet polymerization initiator.

3. A conductive endless belt used as a tandem intermediate transfer member which is disposed between four differing image forming bodies and a recording medium, is circularly driven by a drive member, sequentially transfers toner images from the surfaces of the image forming bodies onto the surface of the belt to temporarily hold them thereon, and transfers the toner images onto a recording medium, the conductive endless comprising a belt base having thereon a resin layer, the resin layer containing a cured ultraviolet or electron beam curable resin, wherein the ultraviolet curable resin contains an ultraviolet polymerization initiator.

4. The conductive endless belt according to claim 1, wherein the resin layer contains a conductive agent.

5. The conductive endless belt according to claim 4, wherein the conductive agent is carbon black.

6. The conductive endless belt according to claim 1, wherein the ultraviolet or electron beam curable resin contains fluorine and/or silicon.

7. The conductive endless belt according to claim 1, wherein the ultraviolet curable resin contains an ultraviolet polymerization initiator having a maximum ultraviolet absorption wavelength of 400 nm or more.

8. The conductive endless belt according to claim 7, wherein the ultraviolet curable resin additionally contains an ultraviolet polymerization initiator having a maximum ultraviolet absorption wavelength below 400 nm.

9. The conductive endless belt according to claim 4, wherein the conductive agent is used in combination of two or more of conductive agents.

10. The conductive endless belt according to claim 1, wherein the thickness of the resin layer is 1 to 30 mm.

11. The conductive endless belt according to claim 5, wherein the content of the carbon black is in the range of 1 to 30 parts by weight with reference to 100 parts by weight of the ultraviolet or electron beam curable resin.

12. The conductive endless belt according to claim 1, wherein the volume resistivity is in the range of $10^2$ Ωcm to $10^{13}$ Ωcm.

13. A method of producing the conductive endless belt according to claim 1, comprising the steps of applying a solvent-free coating liquid containing the ultraviolet or electron beam curable resin to the belt base, and curing the coating liquid thus applied by irradiation with ultraviolet light or electron beams thereby forming the resin layer.

14. An image forming apparatus employing the conductive endless belt according to claim 1.

* * * * *